United States Patent [19]
Oohata et al.

[11] Patent Number: 5,291,788
[45] Date of Patent: Mar. 8, 1994

[54] SEMICONDUCTOR PRESSURE SENSOR

[75] Inventors: Satoshi Oohata, Tokyo; Satoshi Yonemoto; Wataru Fukai, both of Tokorozawa, all of Japan

[73] Assignee: Kabushiki Kaisha Toshiba, Kawasaki, Japan

[21] Appl. No.: 950,162

[22] Filed: Sep. 24, 1992

[30] Foreign Application Priority Data

Sep. 24, 1991 [JP] Japan .................................. 3-243734
Sep. 24, 1991 [JP] Japan .................................. 3-243804
Sep. 7, 1992 [JP] Japan .................................. 4-238503

[51] Int. Cl.$^5$ .............................................. G01L 9/06
[52] U.S. Cl. ........................................ 73/727; 73/721; 73/708; 73/726; 73/756; 338/4
[58] Field of Search ................. 73/720, 721, 726, 727, 73/756, 182; 338/3, 4, 36, 42

[56] References Cited

U.S. PATENT DOCUMENTS 4,528,855 7/1985 Singh .................................. 73/721
5,107,710 4/1992 Huck et al. ......................... 73/721

Primary Examiner—Richard E. Chilcot, Jr.
Assistant Examiner—Richard Moller
Attorney, Agent, or Firm—Oblon, Spivak, McClelland, Maier & Neustadt

[57] ABSTRACT

A semiconductor pressure sensor according to the invention comprises a first semiconductor substrate and a second semiconductor substrate, disposed around the first substrate, so that signals obtained by the semiconductor pressure sensor under static or differential pressure conditions can be properly corrected and both static and differential pressures can be detected accurately and reliably measured on the same semiconductor substrates. Another object of the invention is provide a semiconductor pressure sensor which utilizes a single substrate with an aperture, which acts as a pressure overload stop mechanism, and which does not suffer from any effects of diaphragm deformation as a result of possible pressure overload.

11 Claims, 6 Drawing Sheets

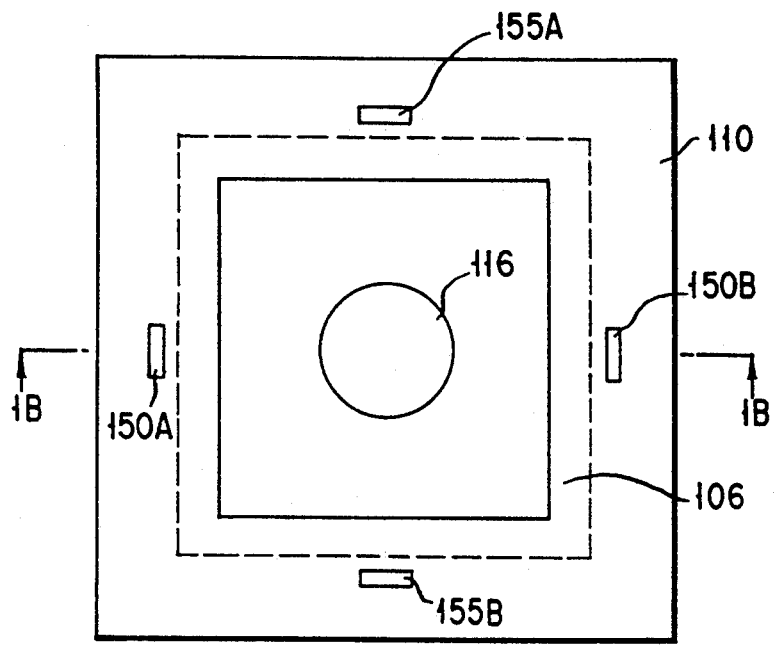
F I G. 6A
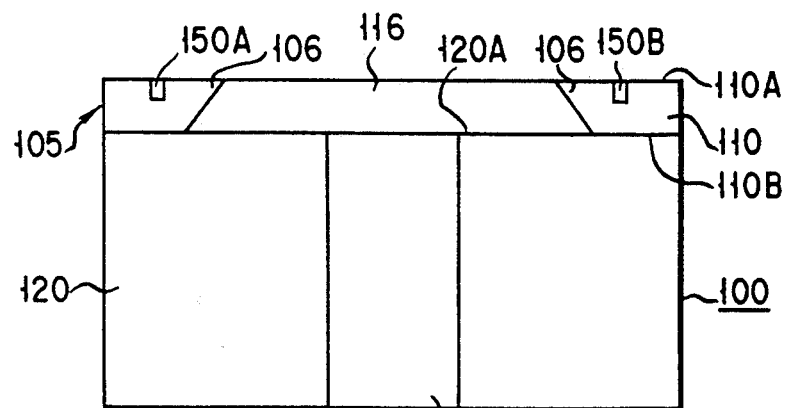
F I G. 6B

SEMICONDUCTOR PRESSURE SENSOR

BACKGROUND OF THE INVENTION

1. Field of the Invention

This invention relates to a semiconductor pressure sensor and, more particularly, it relates to a highly sensitive semiconductor pressure sensor that sensitively detects signals generated under a static or differential pressure condition to accurately determine any static or differential pressure as well as a semiconductor pressure sensor that can be used under very high ambient pressure.

2. Description of the Related Art

Various pressure sensors are known, including semiconductor pressure sensors that are popularly used for differential pressure transducers.

A semiconductor pressure sensor comprises a thin diaphragm of a monocrystalline semiconductive material (e.g., silicon) having an excellent elasticity to accommodate any possible stress produced therein. By sensing the internal stress which is a function of the difference of the pressures applied to the both sides of the diaphragm, it generates and transmits an electric signal representing the difference of pressure.

FIGS. 1A and 1B of the accompanying drawings respectively illustrate a sectional view and a plan view of a conventional semiconductor pressure sensor.

Referring to FIG. 1A, the semiconductor pressure sensor 100 comprises a thin diaphragm 117 made of a monocrystalline silicon substrate 110 having n-type surfaces and formed with a cavity 115 on a side. Such a semiconductor pressure sensor is normally prepared by diffusing a p-type impurity substance on the surface opposite to the one having the cavity 115 to form differential pressure sensors (resistors of a strain gauge) 136A through 136C, forming thereafter a film of an oxide 161 on the semiconductor substrate 110 to cover said differential pressure sensors 136A through 136C and electrically connecting with wires the opposite ends of each of the differential pressure sensors 136A through 136C to respective electrode layers 164 by way of respective holes 162 cut through the oxide film 161. The semiconductor pressure sensor is secured to a hollow and tubular seat 120 and the electrode layer 164 is electrically connected to external terminals (not shown) by wires 163 constructed such as metal wires when used.

Referring now to FIG. 1B, while electrode layers 164 are shown only for the differential pressure sensors 136A through 136C located on the right half of the substrate, such electrode layers 164 are actually formed for all the differential pressure sensors 136A through 136C on the substrate 110.

When the diaphragm 117 of a semiconductor pressure sensor 100 having a configuration as described above is put under stress due to pressure applied thereto, of the differential pressure sensors 136A through 136C formed on the surface of the diaphragm 117, the resistance of only those differential pressure sensors having crystal axes disposed in a certain given direction is raised, whereas the resistance of all the other differential pressure sensors whose crystal axes are arranged in other predetermined directions decreases. Then, the output voltage of a Wheatstone bridge circuit (not shown) constituted by these differential pressure sensors 136A through 136C changes as a function of the change in resistance and a detection signal representing the difference of the output voltage before and after the change is transmitted from it.

A semiconductor pressure sensor 100 of the above described type can generate erroneous signals even when it is subjected to static pressure (pressure commonly applied to the both surfaces of the diaphragm), a phenomenon called a zero shift error.

In a solution that has been proposed for getting rid of zero shift errors, an additional pressure sensor device is used to detect the static pressure applied to it and compensate therewith the output of the semiconductor pressure sensor 100.

This solution, however, requires two sensor devices and, therefore, additional cost. It may be needless to say that a semiconductor pressure sensor that comprises only a single sensor device and still can generate an additional set of signals for correcting the first set of signals is, if realized, by far preferable.

Such a semiconductor pressure sensor is actually known and comprises sensors (static pressure sensors) for detecting strain that may be generated by static pressure. The sensors are arranged on the upper surface 110A of a silicon monocrystalline substrate 110 just as the differential pressure sensors 136A through 136C of a semiconductor pressure sensor as described above so that the outputs of said differential pressure sensors 136A through 136C may be corrected by the corresponding outputs of the static pressure sensors.

The static pressure sensors of such a semiconductor pressure sensor 100 are arranged on a single and same substrate commonly used for differential pressure sensors 136A through 136C to form a pattern of arrangement corresponding to that of the differential pressure sensors 136A through 136C in order for the static pressure sensors to be influenced by ambient temperature in a manner exactly same as the manner in which the differential pressure sensors are affected by ambient temperature. This means that the static pressure sensors are also affected by differential pressure induced strain and, therefore, the output signals of the semiconductor pressure sensor are not necessarily unequivocal and do not always show same response characteristics and the output signals of the static pressure sensors by turn need to be corrected by those of the respective differential pressure sensors, requiring very complicated operations for correction.

In other words, the above described method of correcting the signals of differential pressure sensors by those of static pressure sensors can give rise to large errors.

FIGS. 2A and 2B illustrate another conventional semiconductor pressure sensor which is used for a differential pressure transducer. The components of the semiconductor pressure sensor of FIGS. 2A and 2B that are similar to those of its counterpart of FIGS. 1A and 1B are indicated by same reference numerals and will not be described any further.

The semiconductor pressure sensor 100 of FIGS. 2A and 2B has a cylindrical cavity 115 cut from a surface thereof and is secured to a tubular seat 120 at the side of the cylindrical cavity 115. A pressure guide path 125 is formed in the tubular seat 120 to transmit the applied pressure to the cylindrical cavity 115.

The semiconductor pressure sensor 100 comprises a thin diaphragm section 117 located above the cylindrical cavity 115. The diaphragm section 117 is provided with a pair of radially aligned strain sensors 135A, 135B and another pair of strain sensors 130A, 130B disposed on a radial line perpendicular to the line connecting the sensors 135A, 135B and disposed perpendicular to the line connecting them. The sensors are arranged on the surface of the diaphragm 117 opposite to the one where the cylindrical cavity 115 is formed. The sensors 130A, 130B, 135A, 135B are differential pressure sensors for sensing the difference between the pressures applied to the opposite surfaces of the thin diaphragm 117. The differential pressure sensors and static pressure sensors are in fact stress sensors having certain piezoelectric resistance values that vary as a function of the change in the internal stress of the semiconductor chip. The differential pressure sensors are so wired as to form a bridge circuit that transmits a signal representing the difference between the pressures applied to the opposite surfaces of the thin diaphragm section 117.

Pairs of static pressure sensors 140A, 140B, 145A, 145B are arranged on the substrate where the differential pressure sensors are located in order to detect any strain that may be present under a static pressure condition and show a pattern of arrangement corresponding to that of the differential pressure sensors. Here, a static pressure condition means a condition where the two opposite surfaces of the diaphragm are subjected to a same and equal pressure and, therefore, no differential pressure is existent. The static pressure sensors and the differential pressure sensors are in fact stress sensors that are mutually connected to form a bridge circuit.

A semiconductor pressure sensor having a configuration as described above generates and transmits a differential pressure detection signal whenever the differential pressure sensors detect any strain produced in the thin diaphragm section 117. However, the differential pressure sensors sense strain which is produced in the thin diaphragm section 117 under a static pressure condition. In order to avoid this problem, the differential pressure detection signal is corrected by a signal obtained from the static pressure sensors that sense strain produced in the thin diaphragm section only under a static pressure condition.

A semiconductor pressure sensor as described above can be used for measurement of not only differential pressure but also pressure of other types. A static pressure condition can be obtained when such a semiconductor pressure sensor is placed in an atmosphere whose pressure is to be measured. Then, the pressure can be determined from the signals obtained from the static pressure sensors 140A, 140B, 145A, 145B.

A pressure sensor of the above described type, however, does not necessarily provide unequivocal signals for a stress field that appears in the diaphragm of the pressure sensor. Besides, the thin diaphragm can be damaged when large pressure that exceeds the rated pressure is applied thereto.

As described above, any conventional semiconductor pressure sensors can hardly provide unequivocal and reproducible linear signals and can be damaged when it is subjected to excessively large pressure.

Laid Open Japanese Patent Application No. 54-51489 and U.S. Pat. No. 4,530,244 discloses technologies related to semiconductor pressure sensors of the above described types.

SUMMARY OF THE INVENTION

In view of the above described circumstances, it is therefore a first object of the present invention to provide a semiconductor pressure sensor that can correct signals obtained under a static or differential pressure condition and can measure any static or differential pressure on a same semiconductor substrate as well as a semiconductor pressure sensor that can detect any static or differential pressure in a highly precise and reliable manner.

A second object of the present invention is to provide a semiconductor pressure sensor that is free from any damage due to excess pressure applied thereto and can accurately measure any pressure.

A first construction of a semiconductor pressure sensor according to a first aspect of the present invention is characterized by comprising a first semiconductor substrate made of a monocrystalline semiconductive material having a crystal axis, the first semiconductor substrate having first and second surfaces, a recessed portion being formed on the first surface, a second semiconductor substrate also made of a monocrystalline semiconductive material having a crystal axis, the second semiconductor substrate having first and second surfaces and being disposed around the first semiconductor substrate, a tubular seat having first and second end surfaces, the first end surface being connected to the first surface of the first semiconductor substrate, the first end surface being connected to the first surface of the first semiconductor substrate to surround the recessed portion, the tubular seat comprising a pressure guide path communicating the second end surface and the recessed portion formed in the first semiconductor substrate connected to the first end surface, at least a differential pressure sensor disposed on the second surface of the first semiconductor substrate for detecting differential pressure in a direction vertical to the crystal axis of the first semiconductor substrate, at least a differential pressure sensor disposed on the second surface or the first semiconductor substrate for detecting differential pressure in a direction parallel with the crystal axis of the first semiconductor substrate, at least a static pressure sensor disposed on the second surface of the second semiconductor substrate for detecting static pressure in a direction vertical to the crystal axis of the second semiconductor substrate and at least a static pressure sensor disposed on the second surface of the semiconductor substrate for detecting static pressure in a direction parallel with the crystal axis of the second semiconductor substrate.

With such an arrangement, since the first semiconductor substrate is connected to a central portion of an end surface of the single tubular seat to guide pressure to the recessed portion formed at the bottom side of the first semiconductor substrate via the pressure guide path formed in the tubular seat so that it may be used as a differential pressure sensor and the second semiconductor substrate which is completely separated from the first semiconductor substrate is connected to a peripheral area of the end surface of the tubular seat so that it may be used as a static pressure sensor, signals obtained by the semiconductor pressure sensor under static and differential pressure conditions can be properly corrected and both the static and differential pressures can be detected and accurately and reliably measured on the same semiconductor substrates.

A second construction of a semiconductor pressure sensor according to the first aspect of the inventions characterized by comprising a first semiconductor substrate made of a monocrystalline semiconductive material having a crystal axis, the first semiconductor substrate having first and second surfaces, a tubular seat having first and second end surfaces, the first end surface being connected to the first surface of the first semiconductor substrate, the first end surface being connected to the first surface of the first semiconductor substrate to surround the recessed portion, the tubular seat comprising a pressure guide path communicating the second end surface and the recessed portion formed in the first semiconductor substrate connected to the first end surface, at least a differential pressure sensor disposed on the second surface of the first semiconductor substrate for detecting differential pressure in a direction vertical to the crystal axis of the first semiconductor substrate, at least a differential pressure sensor disposed on the second surface of the first semiconductor substrate for detecting differential pressure in a direction parallel with the crystal axis of the first semiconductor substrate, a second semiconductor substrate also made of a monocrystalline semiconductive material having a crystal axis, the second semiconductor substrate having first and second surfaces and being disposed around the first semiconductor substrate, a second tubular seat having an end connected to the first surface of the second semiconductor substrate to surround the first tubular seat, at least a static pressure sensor disposed on the second surface of the second semiconductor substrate for detecting static pressure in a direction vertical to the crystal axis of the second semiconductor substrate and at least a static pressure sensor disposed on the second surface of the semiconductor substrate for detecting static pressure in a direction parallel with the crystal axis of the second semiconductor substrate.

With such an arrangement, since completely separated first and second tubular seats are used and the first and second semiconductor substrates are respectively connected to the first and second tubular seats so that the second semiconductor substrate can be used exclusive as a static sensor section of the instrument, signals obtained by the semiconductor pressure sensor under static and differential pressure conditions can be properly corrected and both the static and differential pressures can be detected and accurately and reliably measured on the same semiconductor substrates as in the case of the above described first arrangement.

A semiconductor pressure sensor according to the first aspect of the invention can correct signals obtained under a static or differential pressure condition and measure any static or differential pressure on a same semiconductor substrate as well as a semiconductor pressure sensor that can detect any static or differential pressure in a highly precise and reliable manner.

A semiconductor pressure sensor according to a second aspect of the present invention is characterized by comprising a semiconductor substrate having first and second surfaces and an aperture cut through the substrate from the first surface to the second surface and having a given form, a tubular seat made of a material different from that of the semiconductor substrate and having first and second end surfaces, the first end surface being connected to the first surface of the semiconductor substrate to cover the opening, the tubular seat also having a pressure guide path for keeping the second end surface in communication with the first end surface connected to the opening of the semiconductor substrate, and a plurality of strain sensors formed in a peripheral area of the opening on the second surface of the semiconductor substrate.

With such an arrangement, when the pressure to be measured is applied to the tubular seat and the semiconductor substrate, they are strained at the interface because they are made of different materials having different compressibilities. The strain at the interface is then detected by the strain sensors formed on the sensor supporting surface of the semiconductor substrate, which by turn generates and transmits a pressure signal as a function of the strain.

A semiconductor pressure sensor according to the second aspect of the invention can accurately and reliably detect pressure and is free from damage even when it is subjected to excessive pressure.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 6A and 6B are respectively a sectional view and a plan view of a third preferred embodiment of the semiconductor pressure sensor of the invention.

DETAILED DESCRIPTION OF THE PREFERRED EMBODIMENTS

Figure 1A:
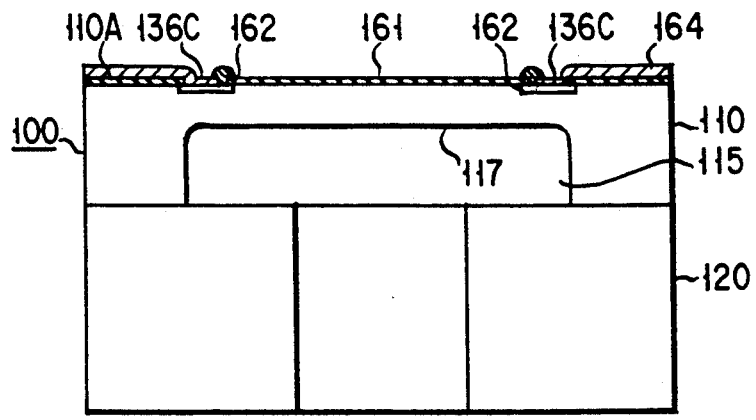
FIGS. 1A and 1B are respectively a sectional view and a plan view of a conventional semiconductor pressure sensor.
Figure 1B:
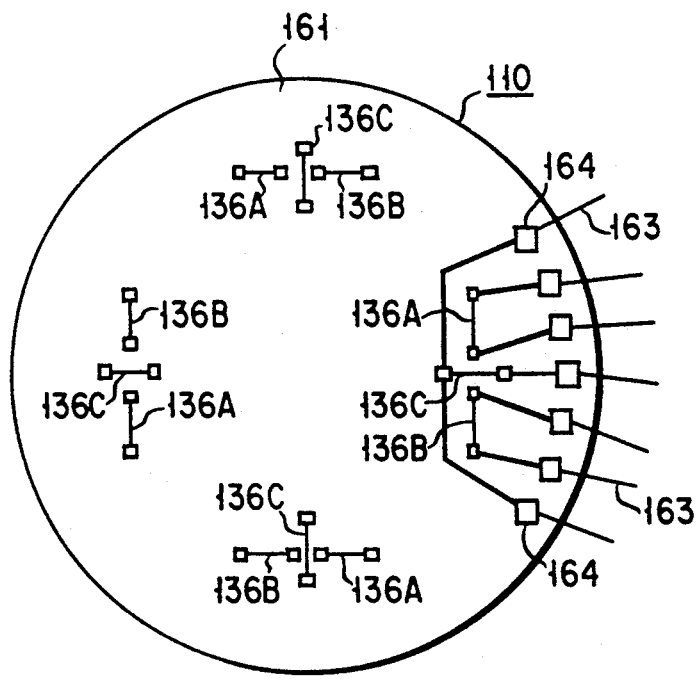
Figure 2A:
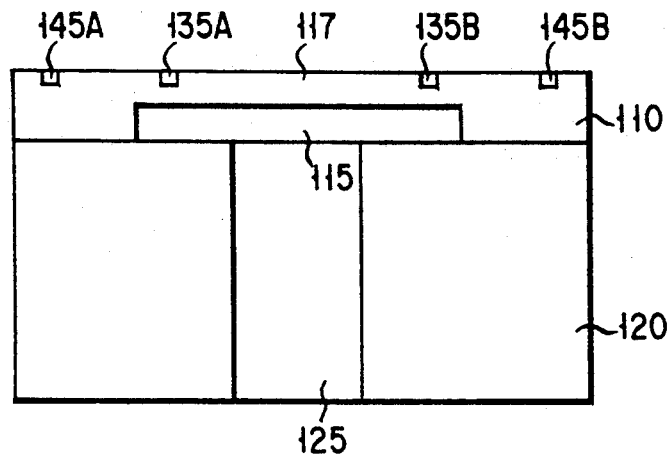
FIGS. 2A and 2B are respectively a sectional view and a plan view of another conventional semiconductor pressure sensor.
Figure 2B:
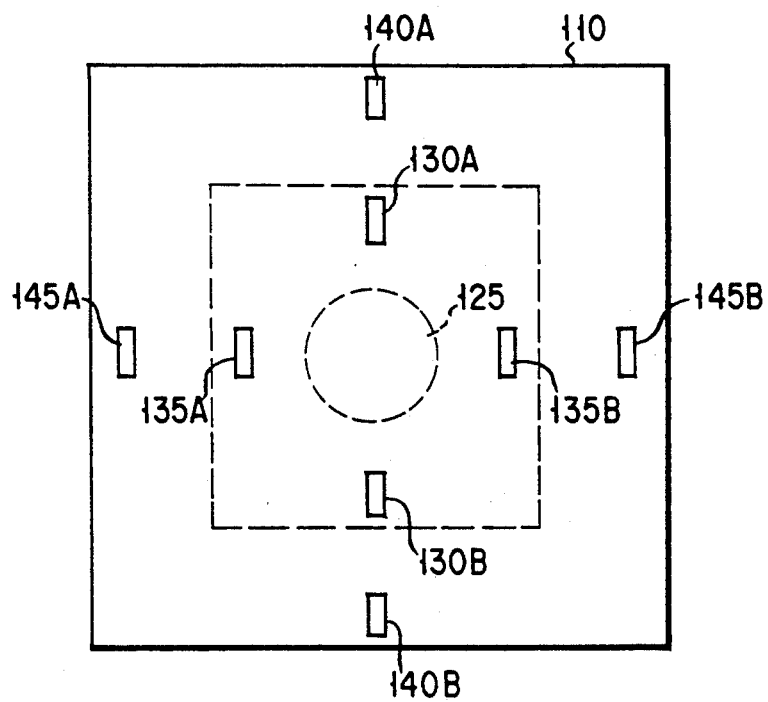
Figure 3A:
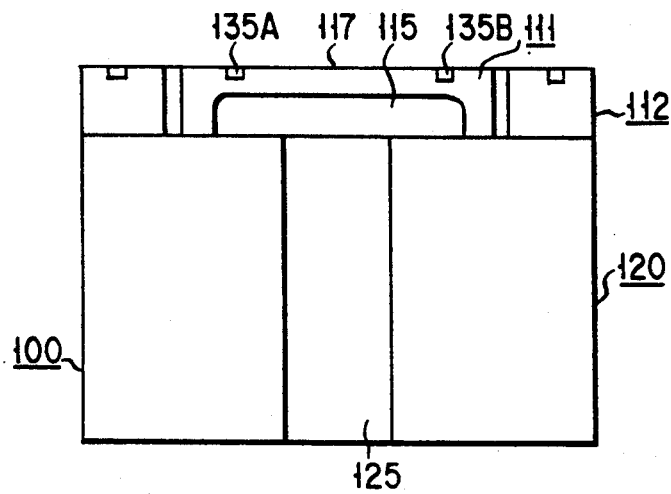
FIGS. 3A and 3B are respectively a sectional view and a plan view of a first preferred embodiment of the semiconductor pressure sensor of the invention.
Figure 3B:
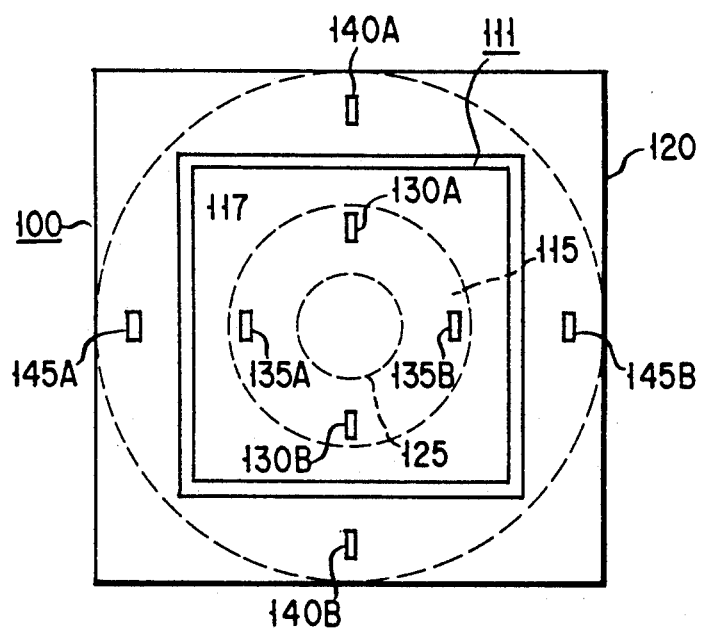

FIGS. 3A and 3B are respectively a sectional view and a plan view of a first preferred embodiment of the semiconductor pressure sensor of the invention.

Referring to FIGS. 3A and 3B, a semiconductor pressure sensor 100 comprises a first relatively thin and rectangular semiconductor substrate 111, a second semiconductor substrate 112 separated from and arranged around the first semiconductor substrate 111 and a tubular seat 120 connected to a surface of the first semiconductor substrate 111 and a corresponding surface of the second semiconductor substrate 112.

The first semiconductor substrate 111 has a rectangular plan view and is made of a monocrystalline material such as silicon. The first semiconductor substrate 111 is provided with a very thin diaphragm section 117 prepared by forming a recessed portion 115 at a center portion of the lower surface (or the underside of FIG. 3A) of the first semiconductor substrate 111. Differential pressure sensors 130A, 130B, 135A, 135B having a desired shape and piezoelectric properties are formed on the upper surface (or the upper side of FIG. 3A) of the first semiconductor substrate 111 in a manner as illustrated in FIG. 3B by diffusing an impurity material such as boron on the first substrate to dope it therewith.

Note that, of the differential pressure sensors 130A, 130B, 135A, 135B, the differential pressure sensors 130A, 130B are disposed along the crystal axis of the substrate, whereas the remaining differential pressure sensors 135A, 135B are disposed along a line perpendicular to the crystal axis.

When the diaphragm section 117 is strained by the difference between the pressure applied on the upper surface and the pressure applied on the lower surface of the diaphragm section 117, the electric resistance of each of the differential pressure sensors 130A, 130B, 135A, 135B varies as a function of the strain and transmits a signal representing the varied resistance as a differential pressure detection signal.

The second semiconductor substrate 112 has a square plan view and is made of a monocrystalline material such as silicon. As in the case of the first semiconductor substrate 111, static pressure sensors 140A, 140B, 145A, 145B having a desired shape and piezoelectric properties are formed on the upper surface (or the upper side of FIG. 3A) of the second semiconductor substrate 112 as integral parts thereof in a manner as illustrated in FIG. 3B by diffusing an impurity material such as boron on the second substrate to dope it with the impurity material.

Again, note that, of the static pressure sensors 140A, 140B, 145A, 145B, the static pressure sensors 140A, 140B are disposed along the crystal axis of the substrate, whereas the remaining differential pressure sensors 145A, 145B are disposed along a line perpendicular to the crystal axis.

When the second semiconductor substrate 112 is strained by the static pressure applied to the area of the semiconductor pressure sensor 100 where the second semiconductor substrate 112 is located, the electric resistance of each of the static pressure sensors 140A, 140B, 145A, 145B varies as a function of the strain and transmits a signal representing the varied resistance as a static pressure detection signal.

The tubular seat 120 is a cylindrical tube of Pyrex glass or the like having an outer diameter substantially equal to the length of an outer edge of the second semiconductor substrate 112. The tubular seat 120 has a coaxial and cylindrical pressure guide path 125 whose diameter is considerably smaller than that of the cylindrical recessed portion 115 and an end (or the upper end of FIG. 3A) of the tubular seat 120 is connected to the lower surface of the first semiconductor substrate 111 and that of the second semiconductor substrate 112 so that the medium transmitting the pressure to be detected is led into the recessed portion 115 of the first semiconductor substrate 111 by way of the pressure guide path 125.

The structural features and their effects of the first embodiment will be described by referring to FIGS. 3A and 3B.

The tubular seat 120 made of Pyrex glass, a material different from that of the second semiconductor substrate 112, is connected to the second semiconductor substrate 112 which is disposed around the first semiconductor substrate 111 that carries the diaphragm section 117. When the differential pressure on the diaphragm section 117 is zero and both the first and second semiconductor substrates 111, 112 are subjected to only static pressure, a relative large strain can be transmitted to the first and second semiconductor substrates 111, 112 having a relatively small compressibility from the tubular seat 120 having a large compressibility. Therefore, the strain produced in the area of the upper surface (in FIG. 3A) of the first semiconductor substrate 111 located directly above the interface of the second semiconductor substrate 112 and the tubular seat 120 is considerably smaller than the strain in the diaphragm section 117.

On the other hand, since the first semiconductor substrate 111 on which the differential pressure sensors 130A, 130B, 135A, 135B are formed is completely separated from the second semiconductor substrate 112 that carries the static pressure sensors 140A, 140B, 145A, 145B, the strain induced on the diaphragm section 117 by the difference between the pressures applied to the opposite surfaces of the diaphragm can hardly be transmitted to the upper surface of the second semiconductor substrate 112 which is completely separated from the first semiconductor substrate 111 that carries the diaphragm section 117.

Thus, the static pressure sensors 140A, 140B, 145A, 145B that principally detect static pressure is substantially free from errors due to differential pressure and can generate unequivocal signals within the variable range of differential pressure to be detected.

Therefore, a set of four differential pressure sensors 130A, 130B, 135A, 135B are almost exclusively dedicated to detection of differential pressure in the diaphragm section 117, while a set of four static pressure sensors 140A, 140B, 145A, 145B are dedicated to generating and transmitting signals representing variations in static pressure applied to the second semiconductor substrate 112 and the tubular seat 120. So, any errors contained in the differential pressure detection signals of the differential pressure sensors 130A, 130B, 135A, 135B can be corrected by the static pressure detection signals of the static pressure sensors 140A, 140B, 145A, 145B to eliminate static pressure error components from the output signals of the differential pressure sensors 130A, 130B, 135A, 135B.

As described above, the tubular seat 120 made of Pyrex glass is connected to a central portion of the lower surface of the first semiconductor substrate 111 to use the surface as a differential pressure sensor section 7 and the second semiconductor substrate 112 is completely separated from and arranged around the periphery of the first semiconductor substrate 111 while the lower surface of the second semiconductor substrate 112 is connected to the tubular seat 120 to use the second semiconductor substrate 112 as a static pressure sensor section. Thus, signals obtained by this first embodiment under a condition where both static pressure and differential pressure exist can be properly corrected and both static pressure and differential pressures can be detected on the same semiconductor substrates in a precise and reliable manner.

While the first and second semiconductor substrates 111, 112 of the first embodiment are rectangular and the tubular seat 120 having a circular outer edge is connected to the lower surfaces of the first and second semiconductor substrates 111, 112 in the above described first embodiment, the first and second semiconductor substrate 111, 112 may alternatively have a different shape. For instance, they may be realized in a circular form or the tubular seat 120 connected thereto may have a square outer peripheral contour.

Figure 4A:
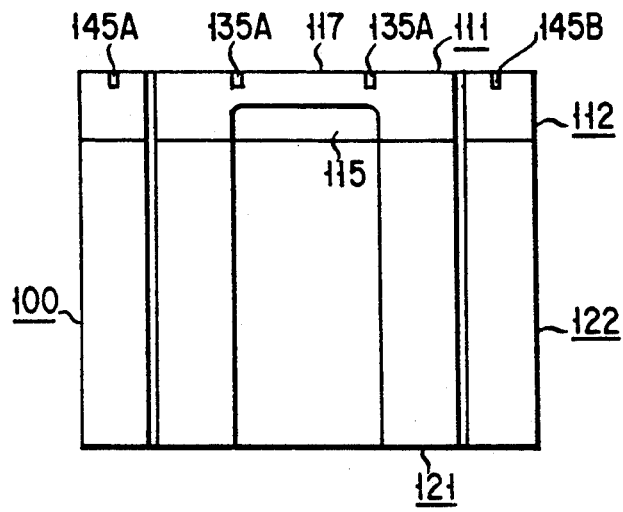
FIGS. 4A and 4B are respectively a sectional view and a plan view of a second preferred embodiment of the semiconductor pressure sensor of the invention.
Figure 4B:
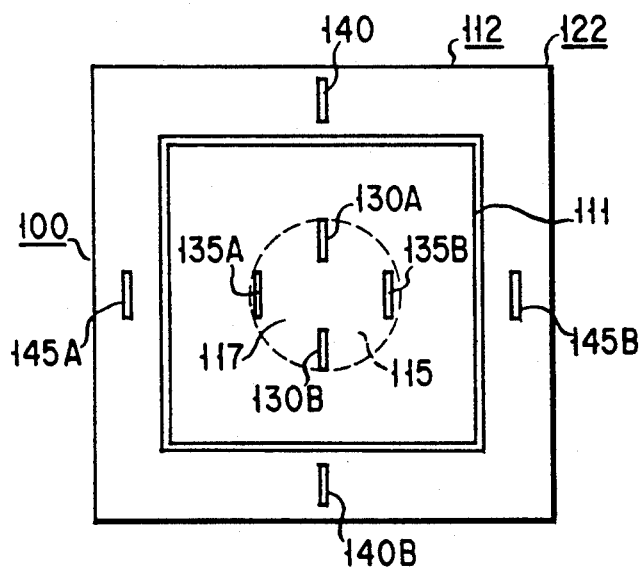
Figure 5:
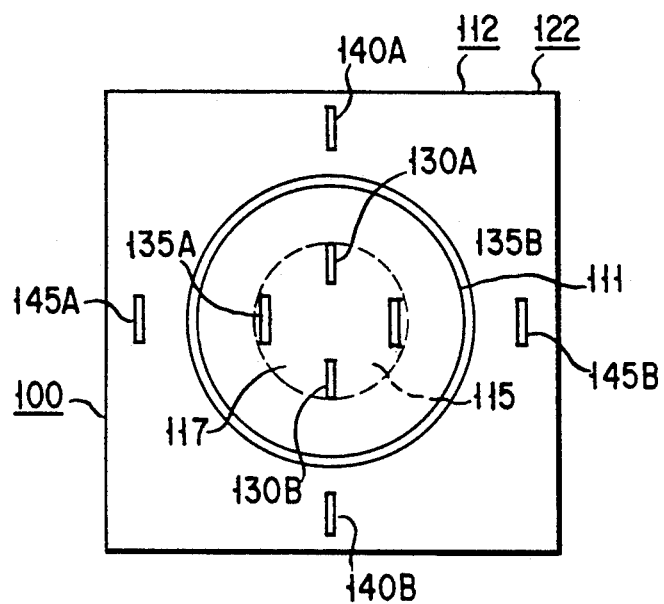
FIG. 5 is a plan view of a semiconductor pressure sensor obtained by modifying the second embodiment.

FIGS. 4A and 4B are respectively a sectional view and a plan view of a second preferred embodiment of the semiconductor pressure sensor of the invention. The component of the second embodiment in FIGS. 4A and 4B that are similar to those of the first embodiment of FIGS. 3A and 3B are indicated by the same reference symbols and will not be described any further.

The second embodiment illustrated in FIGS. 4A and 4B differs from the first embodiment in that the semiconductor pressure sensor 100 comprises a tubular seat 120 which is not hollow cylindrical and has a square plan view and that the tubular seat 120 is actually constituted by a first tubular seat 121 and a second tubular seat 122.

Now, the structural features of the second embodiment will be described in detail.

Referring to FIGS. 4A and 4B, a semiconductor pressure sensor 100 comprises a first relatively thin and rectangular semiconductor substrate 111, a first tubular seat 121 connected to a surface of the first semiconductor substrate 111, a second semiconductor substrate 112 separate from and arranged around the first semiconductor substrate 111 and a second tubular seat 122 connected to the first surface of the second semiconductor substrate 112. The first and second tubular seats 121, 122 of this embodiment have a rectangular plan view and not a circular plan view.

With such an arrangement, as in the case of the first embodiment, the static pressure sensors 140A, 140B, 145A, 145B that principally detect static pressure is substantially free from errors due to differential pressure and can generate unequivocal signals within the variable range of differential pressure to be detected.

Therefore, in the second embodiment, as in the case of the first embodiment, a set of four differential pressure sensors 130A, 130B, 135A, 135B are almost exclusively dedicated to detection of differential pressure in the diaphragm section 117, while a set of four static pressure sensors 140A, 140B, 145A, 145B are dedicated to generating and transmitting signals representing variations in static pressure applied to the second semiconductor substrate 112 and the second tubular seat 122. So, in this second embodiment again, any errors contained in the differential pressure detection signals of the differential pressure sensors 130A, 130B, 135A, 135B can be corrected by the static pressure detection signals of the static pressure sensors 140A, 140B, 145A, 145B to eliminate static pressure error components from the output signals of the differential pressure sensors 130A, 130B, 135A, 135B.

The above described second embodiment brings forth effects similar to those of the first embodiment.

Since the two tubular seats of the second embodiment are completely separated from each other, the effect of separation of the differential pressure sensors and the static pressure sensors can be even greater than that of the first embodiment as the two sets of sensors are less affected by each other.

While the first semiconductor substrates 111 and the first tubular seat 121 of the second embodiment have a rectangular plan view and the second semiconductor substrate 112 and the second tubular seat 122 respectively disposed around the first semiconductor substrate 111 and the first tubular seat 121 also have a rectangular plan view, they may be alternatively so configured that the first semiconductor substrate 111 and the first tubular seat 121 have a circular outer edge and the second semiconductor substrate 112 and the second tubular seat 122 respectively disposed around the first semiconductor substrate 111 and the first tubular seat 121 have a circular inner edge.

FIGS. 6A and 6B care respectively a plan view and a sectional view of a third preferred embodiment of the semiconductor pressure sensor of the invention, FIG. 6B being a sectional view cut along line 1B—1B of FIG. 6A. The component of the second embodiment in FIGS. 6A and 6B that are similar to those of the first and second embodiments of FIGS. 1A through 5 are indicated by the same reference symbols and will not be described any further.

The semiconductor pressure sensor 100 of the third embodiment comprises a sensor chip section 105 used for pressure detection and a tubular seat 120 to which the sensor chip section 105 is fitted.

The sensor chip section 105 is made from a single rectangular semiconductor substrate 110 of a monocrystalline material such as silicon. The semiconductor substrate 110 has first and second surfaces 110A, 110B and a square aperture 116 is cut through from the first surface 110A to the second surface 110B by means of an anisotropic etching technique.

The aperture 116 has a frustoconical longitudinal cross section tapered toward the upper edge with its lower edge defined by the second surface 110B and the upper edge defined by the first surface 110A.

As the semiconductor substrate 110 has an aperture 116 having a frustoconical longitudinal cross section as described above, the peripheral edge 106 of the aperture 116 on the first surface 110A projects inward from its corresponding peripheral edge on the second surface 110B.

A first pair of strain sensors 150A, 150B for detecting strain in the direction parallel with the chip surface of the sensor chip section 105 and a second pair of strain sensors 155A, 155B for detecting strain in the direction perpendicular to the chip surface of the sensor chip section 105 are formed along the peripheral edge 106 of the aperture 116.

The first pair of strain sensors 150A, 150B are disposed on a line equally dividing a pair of opposite edges of the sensor chip section 105 and the second pair of strain sensors 155A, 155B are arranged on a perpendicular bisector of the other pair of opposite edges of the sensor chip section 105.

The strain sensors are integral with the semiconductor substrate 110 and formed by diffusing an impurity material such as boron on sensor forming areas on the second surface to dope them therewith. The strain sensors formed by above described method have piezoelectric resistance properties and its resistance values change according to the strain of the sensors. The shapes of the strain sensors are determined depending on the shape of the sensor chip section 105.

The tubular seat 120 is typically made of Pyrex glass and has a form of quadrangular prism. A pressure guide path 125 having a circular cross section with a diameter smaller than the length of an edge of the square aperture 116 is vertically cut through the central axis of the tubular seat 120. The pressure guide path 125 is aligned with the aperture 116 of the semiconductor substrate 110 and an end surface 120A of the tubular seat 120 is connected to the second surface 110B of the semiconductor path 125 is smaller than an edge of the aperture 116 of the semiconductor substrate 110. The central area of the end surface 120A of the tubular seat 120 is exposed.

When pressure is applied to the sensor chip section 105 and the tubular seat 120 of the third embodiment of the semiconductor pressure sensor of the invention having a configuration as described above, areas around the middle point of the edges of the tubular seat 120 are subjected to compressing force to the greatest extent and hence most severely strained and deformed. As the tubular seat 120 is deformed, strain appears along the interface of the tubular seat 120 and the sensor chip section 105 so that the square sensor chip section 105 is subjected to strain to the greatest extent along the perpendicular bisectors of its edges.

Differently stated, since the tubular seat 120 has a square sectional view and a cylindrical pressure guide path 125 is formed along its axis, compression strain is most remarkably observed near the perpendicular bisectors of the edges of the square sensor chip section 105 whenever the embodiment is subjected to pressure. Besides, since the tubular seat 120 is connected to the sensor chip section 105 made of a material different from that of the tubular seat 120, any large strain on the part of the tubular seat 120 can be easily transmitted to the sensor chip section 105 having a small compressibility. Therefore, deformation appearing at and near the middle point of each edge of the tubular seat 120 will be effectively transmitted to the perpendicular bisector of the corresponding edge of the sensor chip section 105 and its neighboring area as large strain.

As the first and second pairs of strain sensors 150A, 150B, 155A, 155B are respectively arranged on the perpendicular bisectors of the edges or the sensor chip section 105, they can sensitively detect any strain produced as a result of the applied pressure.

Moreover, since the semiconductor substrate 110 has a large central aperture and is not provided with a diaphragm that may be subjected to pressure, the sensor chip section 105 is practically free from damage even if large pressure is applied thereto.

The above described third embodiment comprising a semiconductor substrate 110 provided at the center with an aperture 116, a tubular seat 120 having a cylindrical pressure guide path 125 and connected to a first surface 110A of the semiconductor substrate 110 to cover the aperture 116 and two pairs of strain sensors 150A, 150B, 155A, 155B disposed on the perpendicular bisectors of the edges of the semiconductor substrate 110 as described above can accurately and reliably measure pressure and is free from damage due to excessive pressure.

The semiconductor substrate and the tubular seat of the embodiment are not restricted to the above described shapes. For instance, the semiconductor substrate may have a square plan view with a circular aperture disposed at the center and the tubular seat connected thereto may be realized to a cylindrical form. Alternatively, the square semiconductor substrate may be replaced by a circular semiconductor substrate having a coaxial circular aperture, to which a tubular seat having a circular cross section is connected.

While the aperture 116 of the above described third embodiment is frustoconical in the longitudinal cross section, it may alternatively be cylindrical and have a constant diameter or, still alternatively, it may have a diameter that changes in a stepped manner. The dimensional relationship between the diameter of the aperture of the sensor chip and that of the pressure guide path of the tubular seat is also not limited to the above described.

The strain that appears on the interface of the tubular seat and the sensor chip will be proportional to the pressure applied to the semiconductor pressure sensor even when the compressibility of the tubular seat is smaller than that of the sensor chip. Therefore, the tubular seat and the sensor chip may be made of materials having such a relationship.

It should be noted that the present invention is not limited to the above described embodiments, which may be modified in many different way without departing from the spirit and the scope of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A semiconductor pressure sensor comprising: a first semiconductor substrate made of a monocrystalline semiconductive material having a crystal axis, the first semiconductor substrate having first and second surfaces, a recessed portion being formed on the first surface;

a second semiconductor substrate also made of a monocrystalline semiconductive material having a crystal axis, the second semiconductor substrate having first and second surfaces and being disposed around the first semiconductor substrate;

a tubular seat having first and second end surfaces, the first end surface being connected to the first surface of the first semiconductor substrate, the first end surface being connected to the first surface of the first semiconductor substrate to surround the recessed portion, the tubular seat comprising a pressure guide path communicating the second end surface the recessed portion;

at least a differential pressure sensor disposed on the second surface of the first semiconductor substrate for detecting differential pressure in a direction vertical to the crystal axis of the firs semiconductor substrate;

at least a differential pressure sensor disposed on the second surface of the first semiconductor substrate for detecting differential pressure in a direction parallel with the crystal axis of the first semiconductor substrate;

at least a static pressure sensor disposed on the second surface of the second semiconductor substrate for detecting static pressure in a direction vertical to the crystal axis of the second semiconductor substrate; and at least a static pressure sensor disposed on the second surface of the semiconductor substrate for detecting static pressure in a direction parallel with the crystal axis of the second semiconductor substrate.

2. A semiconductor pressure sensor according to claim 1, wherein the tubular seat is made of Pyrex glass.

3. A semiconductor pressure sensor according to claim 1, wherein the differential pressure sensors and the static pressure sensors are formed by diffusion and doping of an impurity material.

4. A semiconductor pressure sensor comprising:

a first semiconductor substrate made of a monocrystalline semiconductive material having a crystal axis, the first semiconductor substrate having first and second surfaces;

a tubular seat having first and second end surfaces, the first end surface being connected to the first surface of the first semiconductor substrate, the first end surface being connected to the first surface of the first semiconductor substrate to surround the recessed portion, the tubular seat comprising a pressure guide path communicating the second end surface the recessed portion;

at least a differential pressure sensor disposed on the second surface of the first semiconductor substrate for detecting differential pressure in a direction vertical to the crystal axis of the first semiconductor substrate;

at least a differential pressure sensor disposed on the second surface of the first semiconductor substrate for detecting differential pressure in a direction parallel with the crystal axis of the first semiconductor substrate;

a second semiconductor substrate also made of a monocrystalline semiconductive material having a crystal axis, the second semiconductor substrate having first and second surfaces and being disposed around the first semiconductor substrate;

a second tubular seat having an end connected to the first surface of the second semiconductor substrate to surround the first tubular seat;

at least a static pressure sensor disposed on the second surface of the second semiconductor substrate for detecting static pressure in a direction vertical to the crystal axis of the second semiconductor substrate; and at least a static pressure sensor disposed on the second surface of the semiconductor substrate for detecting static pressure in a direction parallel with the crystal axis of the second semiconductor substrate.

5. A semiconductor pressure sensor according to claim 4, wherein the first and second tubular seats are made of Pyrex glass.

6. A semiconductor pressure sensor according to claim 4, wherein the differential pressure sensors and the static pressure sensors are formed by diffusion and doping of an impurity material.

7. A semiconductor pressure sensor comprising:

a semiconductor substrate having first and second surfaces and an aperture cut through the substrate from the first surface to the second surface and having a given form;

a tubular seat made of a material different from that of the semiconductor substrate and having first and second end surfaces, the first end surface being connected to the first surface of the semiconductor substrate to cover the opening, the tubular seat also having a pressure guide path for keeping the second end surface in communication with the first end surface connected to the opening of the semiconductor substrate; and a plurality of strain sensors formed in a peripheral area of the opening on the second surface of the semiconductor substrate.

8. A semiconductor pressure sensor according to claim 7, wherein the semiconductor substrate is made of a monocrystalline material.

9. A semiconductor pressure sensor according to claim 7, wherein the aperture is formed by anisotropic etching.

10. A semiconductor pressure sensor according to claim 7, wherein the tubular seat is made of Pyrex glass.

11. A semiconductor pressure sensor according to claim 7, wherein the strain sensors are formed by diffusion and doping of an impurity material onto the semiconductor substrate.

* * * * *